Figure 1:
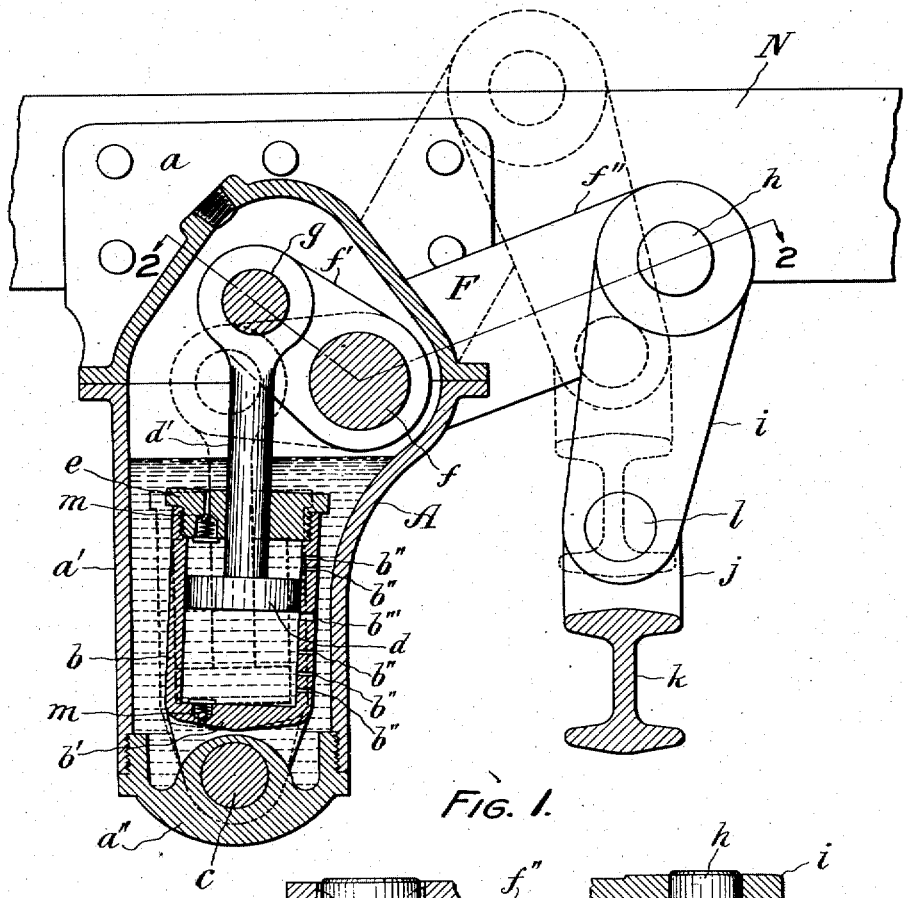

Aug. 20, 1929. G. R. PENNINGTON Re. 17,409

SHOCK ABSORBER FOR MOTOR VEHICLES

Original Filed Jan. 5, 1922

Inventor

Gordon R. Pennington

By Ray A. Kahr

Attorney

Reissued Aug. 20, 1929. Re. 17,409

UNITED STATES PATENT OFFICE.

GORDON R. PENNINGTON, OF CLEVELAND HEIGHTS, OHIO, ASSIGNOR TO PENNINGTON ENGINEERING COMPANY, OF CLEVELAND, OHIO, A CORPORATION OF OHIO.

SHOCK ABSORBER FOR MOTOR VEHICLES.

Original application filed January 5, 1922, Serial No. 527,228. Renewed April 7, 1927. Original No. 1,677,405, dated July 17, 1928. Application for reissue filed June 10, 1929. Serial No. 369,831.

This invention relates to devices which are designed to be interposed between the axles of a spring equipped vehicle and the body or chassis frame thereof with the object of absorbing in part the shocks or blows resulting from striking obstructions or running into holes or ruts in the road, and of checking the rebound of the springs.

When the wheel of a running vehicle passes over a projection from the road surface, the axle is driven towards the frame of the vehicle and if it is not to strike the latter the energy of impact must be absorbed. The rate at which this energy is absorbed determines the force transmitted to the frame. As vehicles are commonly operated the greater part of the time over relatively even ground surfaces and only a small part of the time over extremely irregular ground surfaces, it is better in practice to absorb as little as possible of the impact energy when the axle is at or near its normal position with respect to the chassis frame and to absorb an increasing proportion of this energy, preferably by means supplemental to the springs, as the axle approaches the frame. This will permit the use of softer or more flexible springs and is thus equivalent to favoring average operating conditions at the expense of the relatively rare extreme conditions, though the latter conditions, too, are taken care of in the best possible way from the standpoints of both car and rider. To accomplish this a shock absorber is necessary which will offer little or no resistance to spring compressing movement of the axle at or near its normal position but which will offer a resisting force increasing rapidly as the axle moves from its normal range of positions towards the chassis frame.

After the energy of impact from a road projection has been absorbed the spring will tend to return as much of this energy as it has absorbed to the axle and the frame, by imparting movements to these parts in inverse proportion to their masses. As this would mean a further displacement of the frame, with the resulting discomfort to the occupants, it is desirable to absorb this energy of spring rebound in the shock absorber. The latter should therefore develop a force checking the rebound of the spring and the corresponding return of the axle from its position nearest the frame, which force may be nicely graduated according to the stiffness of the spring and the masses involved.

When the wheel of a running vehicle passes over a depression in a road, the weight of the wheel and axle and the spring force tend to force the wheel into the depression. To secure greatest riding comfort, this tendency must be retarded as the deeper the wheel penetrates into the depression the more severe will the shock be when it is driven out by the far side of the depression. It is desirable therefore that a shock absorber should resist a movement of the axle from its normal position away from the frame in an amount which can be readily determined to compensate for gravity and spring forces. This latter requirement coincides with that noted in the last preceding paragraph relative to absorption of the energy of spring rebound.

When, however, the wheel has sunk into a depression, it should be as free as possible to rise out thereof, and a shock absorber should therefore offer the minimum resistance to movement of the axle from below normal position towards the frame.

The provision of resistance to movement of the axle from its normal position away from the frame for the purpose specified in next to the last preceding paragraph, accomplishes the further important result of securing stability, especially lateral stability, of the body of the vehicle notwithstanding the use of unusually soft or flexible suspension springs.

The chief objects of the present invention are comprised in the provision of a hydraulic shock absorber which is capable of meeting the above described conditions, which is not subject to trouble incident to the leakage of the working liquid and reliably performs its functions with a minimum of attention and which is characterized by relatively great compactness and lightness of weight.

Other objects more or less ancillary to the foregoing, as well as the manner of attaining all of the various objects, will be apparent from the following description in conjunction with the accompanying drawing.

In the drawing, Fig. 1 is a sectional side view of a device embodying the invention.

Figure 2:
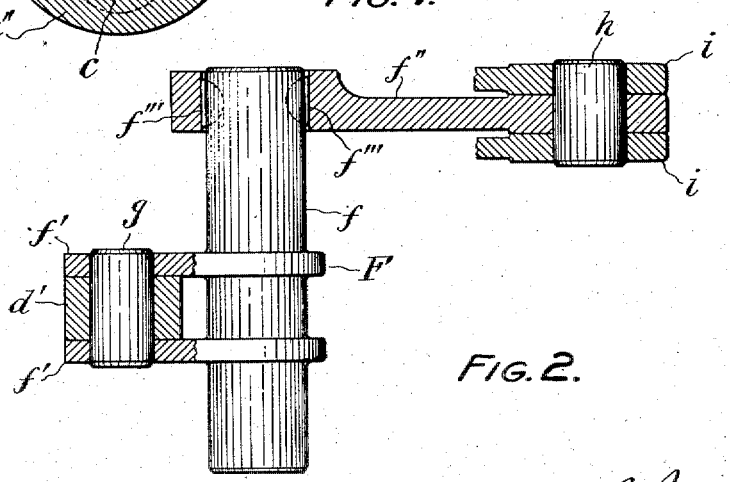

Fig. 2 is a section on the line 2—2—2 of Fig. 1, showing the rocker shaft and connected parts viewed in the direction indicated by the arrows.

Referring in detail to the construction illustrated, (A) is a shell or casing, and comprises the top part ($a$), the middle part ($a'$), and the bottom cap ($a''$).

($b$) is a cylinder which carries on its lower end the projections ($b'$) which are pivotally fixed to the bottom cap ($a''$) by means of a cylindrical pin ($c$).

A piston ($d$) is fixed to the piston rod ($d'$), which passes through a hole drilled in the cylinder cap ($e$), which is threaded in the cylinder ($b$). The piston in effect divides the cylinder into two chambers.

(F) is a rocker shaft comprising the cylindrical portion ($f$) from which extend the arms ($f'$), and also the arms ($f''$) fixed to the cylindrical portion by means of keys ($f'''$). The rocker shaft (F) is carried in bearings formed half in the top part ($a$) and half in the middle part ($a'$) of the casing (A). The arms ($f'$) are pivotally secured to the piston rod ($d'$) by means of the pin ($g$). The arm ($f''$) is pivotally secured to the links ($i$) by means of the cylindrical pin ($h$).

I prefer to pivotally secure the links ($i$) to a projection ($j$) formed on the axle ($k$) by means of the cylindrical pin ($l$), and to fix the casing (A) by means of a flange on the top part ($a$) to the frame (N).

For reasons which will later be explained the arms ($f'$) are disposed at an angle between 90° and 180° to the arm ($f''$) and the latter arm is in its normal position upwardly inclined from the horizontal.

Check valves ($m$) of any form in common use are provided at the bottom of the cylinder ($b$) and in the cylinder cap ($e$) so disposed as to permit the free movement of liquid into the cylinder chambers on the respective sides of the piston ($d$), but not out from the said chambers. Ports ($b''$) and ($b'''$) are provided in the walls of the cylinder ($b$) arranged substantially as shown. I prefer to make the middle port ($b'''$) considerably larger than the other ports for a purpose to be set forth hereinafter.

A fluid, preferably glycerine, is introduced in the casing (A) in sufficient quantity to cover the cylinder ($b$).

The operation of the device is as follows: When the axle ($k$) moves (with respect to the frame (N)) from its normal position with the vehicle loaded, as shown in full lines, to the position shown in dotted lines, as when an upward projection on the road surface is encountered, the rocker shaft (F) is rotated, and the piston ($d$) moves toward the bottom of the cylinder ($b$). During the first part of the motion of the piston ($d$) little resistance is offered to its motion by virtue of the fact that the several ports ($b''$) and, at the beginning of the movement, the port ($b'''$) permit the rapid outflow of the fluid contained between the piston ($d$) and the end of the cylinder ($b$). Further movement of the piston ($d$) in the downward direction covers up successively the ports ($b''$) one by one and as less area becomes thus available for the outflow of the fluid, an increasing pressure of the fluid is required to maintain the outflow, and this pressure reacts through the mechanism to oppose the upward movement of the axle ($k$). The rate of increase of the fluid pressure may be controlled at will by varying the number and sizes of the ports ($b''$). In any case, however, the resistance to the first part of the movement referred to will be relatively small in comparison with the resistance at the end of said movement, and preferably the resistance to the first part of said movement will be negligible in the sense that its effect is not markedly noticeable to an occupant of the vehicle.

I prefer to so locate the ports that the resistance to the upward motion of the axle ($k$) with respect to the frame (N) shall be substantially prevented beyond a certain predetermined point.

While the diminishing number or size of the ports ($b''$) increase the resistance to the movement of the piston as it moves toward the end of the cylinder, the angular relation of the arms ($f'$) and ($f''$), above noted, as the axle simultaneously approaches the frame, is such that the force of the movement of the axle is transmitted through the links ($i$), arm ($f''$) and arms ($f'$) with a markedly decreasing mechanical advantage. The result is that the stresses set up in the parts of the device within the casing are correspondingly diminished and said parts can be made correspondingly small and light. Furthermore, as the arm ($f''$) approaches a vertical position the stress to which it is subjected gradually changes from a bending to a tension stress. Consequently, the arm can be made lighter than otherwise would be possible and still be strong enough to sustain the increasing load. In other words, although the device is called upon effectively to resist an external spring compressing shock or force which is much greater than the spring expanding or rebound force which it must resist, the decreased mechanical advantage with which the greater force is applied makes a liquid forcing means which is strong enough only to resist the smaller of the external forces also strong enough to resist the greater force.

When the axle ($k$) moves away from the frame (N) the piston ($d$) will move upward in the cylinder ($b$). I prefer to so dispose the ports ($b''$), and to make them of such size that movement of the axle away from the frame (considering that said movement is at a lower velocity than the opposite movement incident to the shock of an obstacle encountered), will be resisted in such a manner that the commonly known effect of recoil damping or checking may be obtained and also sudden movement of the axle below its normal position in relation to the frame may be resisted. When the axle is moving away from the point at which it is nearest to the frame (N), the piston (*d*) is obviously moving upwards in the cylinder (*b*). Little resistance is offered to such motion as long as the large central port (*b'''*) is uncovered. Before the piston reaches its normal position, however, the port (*b'''*) is covered by the piston, and from then on a greater resistance is offered to the further upward movement of the piston. The upper ports (*b''*) are of such size that the proper fluid pressures are developed to substantially absorb the recoil energy in the spring, and dampen the oscillations of the latter. To accomplish this the resistance to the movement of the piston reaches a value at or near the normal position thereof which is materially greater than the resistance to the movement of the piston in the opposite direction at its normal position. Thus the movement of the axle away from the frame is resisted during the first part thereof by a force that is small in relation to the resistance at the end of said movement. Considered in another aspect, this resistance during the first part of the movement of the axle away from the frame is "negligible", using the latter word in the sense noted above. Following this first part of the movement of the axle away from the frame, i. e., when the piston covers the large port (*b'''*), the resistance increases to an amount that is clearly appreciable to an occupant of the vehicle. It will be understood that in referring above to the "normal position" of the piston that I mean its position in the cylinder when the vehicle with normal or average load is standing still or moving over a smooth road surface. Such a position is illustrated by the full line showing in the drawing. The normal position of the shaft (F) is, of course, that corresponding to the normal position of the piston.

The spring recoil having been damped, the axle and frame are permitted to return relatively freely to their normal relative positions since the combined capacity of the large port (*b'''*) and the ports (*b''*) offer a resistance to the piston that is negligible in the sense above noted and that, in another aspect of the matter, is small in proportion to the resistance at or near the end of the piston movement in the same direction. In this connection it is to be noted that the resistance to the first part of the shock absorbing movement and the resistance to the first part of the movement that checks the spring recoil, in order to be "negligible" in the sense noted in each instance, may be different in absolute amount; and in the preferred practice the latter resistance will be less than the former.

A vehicle equipped with my improved shock absorbers may have relatively soft or flexible springs because a large part of the energy of shocks incident to passage over rough road surfaces is absorbed by the shock absorbers and a lesser amount need be absorbed by the springs. And since the spring compression is left relatively free of resistance by the shock absorbers when the pistons of the latter are in the intermediate parts of their range of movement, full advantage is taken of the softness of the springs in passing over slightly or moderately rough road surfaces and as extremely rough road surfaces are only rarely encountered, the average riding qualities of the vehicle are vastly improved. Although unusually soft or flexible springs are used in securing this result the lack of stability which would ordinarily attend the use of such springs is obviated because the resistance offered by the shock absorbers to separation of the frame and axle from each other, when they are at or near their normal relative positions, effectively resists side sway of the vehicle body. Along with the enhanced riding comfort referred to there is naturally achieved a reduction in the wear and tear on the vehicle that results from passage over rough road surfaces.

Not only does my improved shock absorber satisfactorily perform the functions that have been pointed out, but by reason of the pivotal mounting of the cylinder within the casing a high degree of compactness is attained and by reason of this feature and the minimizing of the necessary strength of the parts that results from the relative angular relations of the inner and outer crank arms of the device, both the weight and the necessary cost of production of the device are reduced to a minimum.

Furthermore, the complete submergence of the cylinder in the body of liquid tends to insure a complete filling of the cylinder chambers by the liquid under all conditions. In this connection it should be observed that the space surrounding the cylinder and occupied by the reserve or surplus liquid is of relatively large caliber so that any air in the casing that becomes mixed with the liquid due to the splashing or churning of the latter, readily separates from the liquid and rises again to the top of the casing. Thus the drawing of air into the cylinder is avoided and the reliable checking action of the liquid unmixed with air is secured.

Again, the fact that operative connection between the checking piston and the operating means external to the casing is effected by a rotatable shaft extending through the wall of the casing, makes it relatively easy to prevent leakage of liquid from the casing since the joint between the casing and a rotating shaft is readily made practically liquid tight. Thus the device can be operated for long periods without renewing any liquid and its rugged and simple construction renders it reliable in operation.

It is to be understood that in many respects my invention is not limited to the particular forms of construction illustrated, that as to some features there can be wide variation in the form and construction of the parts constituting the double-acting liquid forcing means of the device and that changes of various kinds may be made in the specific construction shown without departing from the invention as defined in the appended claims.

What I claim is:

1. In a shock absorber for vehicles, the combination of a casing forming a substantially liquid-tight chamber; a body of liquid in said chamber; a shaft extending from the outside to the inside of said casing through the wall thereof and rotatable in relation thereto; and double acting liquid forcing means in said casing comprising two liquid chambers and piston means movable therein and operatively connected to the said shaft, said liquid forcing means being provided with means affording and controlling liquid inlet to and outlet from the said chambers, the said chambers in the normal operation of the device having communication with the said body of liquid and the said means affording and controlling liquid inlet to and outlet from the said chambers adapting the said forcing means to resist the relative rotation of the said shaft in one direction by a force which is relatively small during movement from one extreme to the intermediate normal position of said shaft and which increases to a maximum at a predeterminable relative rate as the rotation proceeds from said normal position to the opposite extreme, and to resist the relative rotation of the said shaft in the opposite direction by a force which increases at a predeterminable relative rate from a relatively small value in that position in which the resisting force is a maximum for the first-named movement, said forces varying furthermore with the speed of rotation of said shaft.

2. In a shock absorber for vehicles, the combination of a casing forming a substantially liquid-tight chamber; a body of liquid in said chamber; a shaft extending from the outside to the inside of said casing through the wall thereof and rotatable in relation thereto; and double acting liquid forcing means in said casing comprising two liquid chambers and piston means movable therein and operatively connected to the said shaft, said liquid forcing means being provided with means affording and controlling liquid inlet to and outlet from the said chambers, the said chambers in the normal operation of the device having communication with the said body of liquid through openings communicating with said liquid below the level thereof and the said means affording and controlling liquid inlet to and outlet from the said chambers adapting the said forcing means to resist the relative rotation of the said shaft in one direction by a force which is relatively small during movement from one extreme to the intermediate normal position of said shaft and which increases to a maximum at a predeterminable relative rate as the rotation proceeds from said normal position to the opposite extreme, and to resist the relative rotation of the said shaft in the opposite direction by a force which increases at a predeterminable relative rate from a relatively small value in that position in which the resisting force is a maximum for the first-named movement, said forces varying furthermore with the speed of rotation of said shaft.

3. In a shock absorber for vehicles, the combination of a casing forming a substantially liquid-tight chamber; a body of liquid in said chamber; a shaft extending from the outside to the inside of said casing through the wall thereof and rotatable in relation thereto; and double acting liquid forcing means in said casing comprising two liquid chambers and piston means movable therein and operatively connected to the said shaft; said liquid forcing means being provided with means affording and controlling liquid inlet to and outlet from the said chambers, and adapting the said forcing means to resist the relative rotation of the said shaft in one direction by a force which is relatively small during movement from one extreme to the intermediate normal position of said shaft and which increases to a maximum at a predeterminable relative rate as the rotation proceeds from said normal position to the opposite extreme, and to resist the relative rotation of the said shaft in the opposite direction by a force which increases at a predeterminable relative rate from a relatively small value in that position in which the resisting force is a maximum for the first-named movement to a value at the normal position of the shaft which is greater than the value of the resistance at the normal position of the shaft for the movement in the opposite direction, said forces varying furthermore with the speed of rotation of said shaft.

4. In a shock absorber for vehicles, the combination of a casing forming a substantially liquid-tight chamber; a body of liquid in said chamber; a shaft extending from the outside to the inside of said casing through the wall thereof and rotatable in relation thereto; and double acting liquid forcing means in said casing comprising two liquid chambers and piston means movable therein and operatively connected to the said shaft, said liquid forcing means being provided with means affording and controlling liquid inlet to and outlet from the said chambers, the said chambers in the normal operation of the device having communication with the said body of liquid through openings communicating with said liquid below the level thereof and there being spaces for liquid between said openings and the level of the liquid of large caliber adapted to insure free escape from the liquid of any air mixing therewith during the operation of the device, and the said means affording and controlling liquid inlet to and outlet from the said chambers adapting the said liquid forcing means to resist the relative rotation of the said shaft in one direction by a force which is relatively small during movement from one extreme to the intermediate normal position of said shaft and which increases to a maximum at a predeterminable relative rate as the rotation proceeds from said normal position to the opposite extreme, and to resist the relative rotation of the said shaft in the opposite direction by a force which increases at a predeterminable relative rate from a relatively small value in that position in which the resisting force is a maximum for the first-named movement, said forces varying furthermore with the speed of rotation of said shaft.

5. In a shock absorber for vehicles, the combination of a casing forming a substantially liquid-tight chamber; a body of liquid in said chamber; a shaft extending from the outside to the inside of said casing through the wall thereof and rotatable in relation thereto; and double acting liquid forcing means in said casing comprising a double acting cylinder in the casing submerged in said body of liquid and piston means movable in the cylinder and operatively connected to the said shaft, said liquid forcing means being provided with means affording and controlling liquid inlet to and outlet from the two chambers of the cylinder, the said chambers in the normal operation of the device having communication with the said body of liquid and the said means affording and controlling liquid inlet to and outlet from the said chamber adapting the said forcing means to resist the relative rotation of the said shaft in one direction by a force which is relatively small during movement from one extreme to the intermediate normal position of said shaft and which increases to a maximum at a predeterminable relative rate as the rotation proceeds from said normal position to the opposite extreme, and to resist the relative rotation of the said shaft in the opposite direction by a force which increases at a predeterminable relative rate from a relatively small value in that position in which the resisting force is a maximum for the first-named movement, said forces varying furthermore with the speed of rotation of said shaft.

6. In a shock absorber for vehicles, the combination of a casing forming a substantially liquid-tight chamber; a body of liquid in said chamber; a shaft extending from the outside to the inside of said casing through the wall thereof and rotatable in relation thereto; an arm fixed to the inner portion of said shaft; and double-acting liquid forcing means in said casing comprising a cylinder closed at both ends and completely immersed in the body of liquid in the casing, said cylinder being connected to the casing in a manner permitting the cylinder to swing about an axis parallel to the axis of said shaft, and a piston in the cylinder having a rod extending through one end of the cylinder and directly pivotally connected to the arm on the inner portion of the shaft, said liquid forcing means being provided with means comprising ports through the walls of the cylinder and communicating with the body of liquid in the casing for controlling the flow of liquid into and out of the cylinder at each side of the piston; the last named means adapting the liquid forcing means to resist the relative rotation of the said shaft in one direction by a force which is relatively small during movement from one extreme to the intermediate normal position of said shaft and which increases to a maximum at a predeterminable relative rate as the relative rotation proceeds from said normal position to the opposite extreme, and to resist the rotation of the said shaft in the opposite direction by a force which increases at a predeterminable relative rate from a relatively small value in that position in which the resisting force is a maximum for the first-named movement, said forces varying furthermore with the speed of rotation of said shaft.

7. In a shock absorber for vehicles, the combination of a casing forming a substantially liquid-tight chamber; a body of liquid in said chamber; a shaft projecting from the outside to the inside of said casing and journaled in the wall thereof; an arm fixed to the inner portion of said shaft; and double-acting liquid forcing means in said casing comprising a cylinder closed at both ends and completely immersed in the body of liquid in the casing, said cylinder being connected to the casing in a manner permitting the cylinder to swing about an axis parallel to the axis of said shaft, and a piston in the cylinder having a rod extending through the opposite end of the cylinder and directly pivotally connected to the arm on the inner portion of the shaft; said liquid forcing means being provided with means comprising ports through the walls of the cylinder and communicating with the body of liquid in the casing for controlling the flow of liquid into and out of the cylinder at each side of the piston.

8. In a shock absorber for vehicles, the combination of a casing forming a substantially liquid-tight chamber; a body of liquid in said chamber; a shaft extending from the outside to the inside of said casing through the wall thereof and rotatable in relation thereto; and double acting liquid forcing means in said casing comprising two liquid chambers and piston means movable therein and operatively connected to the said shaft, said liquid forcing means being provided with means affording and controlling liquid inlet to and outlet from the said chambers, and adapting the said liquid forcing means to resist the relative rotation of the said shaft by a force varying with the speed of rotation and further varying as follows: (A) When the piston is moving from its normal position towards one end of the cylinder, the resisting force shall increase from a negligible quantity at or near such normal position, at a rate relatively predeterminable, to a maximum near that end of the cylinder; (B) When the piston is moving away from the end of the cylinder above referred to, the resisting force shall vary at a relatively predeterminable rate from a negligible quantity at the said end to an appreciable quantity at or before the normal position and to a maximum quantity at or near the opposite end; (C) When the piston is moving from the end of the cylinder opposite to that first above referred to, towards its normal position, the resisting force shall be negligible.

9. In a shock absorber for vehicles, the combination of a casing forming a substantially liquid-tight chamber; a body of liquid in said chamber; a shaft extending from the outside to the inside of said casing through the wall thereof and rotatable in relation thereto; and double acting liquid forcing means comprising two liquid chambers and piston means movable therein operatively connected to the said shaft, the said liquid forcing means being provided with passages affording and controlling liquid inlet to and outlet from the said liquid chambers and the said passages adapting the said forcing means in the operation of the device to resist the relative rotation of the shaft in one direction by a force substantially greater at approximately the end of such rotation than at any other point thereof and to resist the relative rotation of the shaft in the other direction by a force which, before the shaft reaches normal position, has become appreciable though markedly less than the maximum force resisting rotation in the first direction.

10. In a shock absorber for vehicles, the combination of a casing forming a substantially liquid-tight chamber; a body of liquid in said chamber; a shaft extending from the outside to the inside of said casing through the wall thereof and rotatable in relation thereto; and double acting liquid forcing means comprising two liquid chambers and piston means movable therein operatively connected to the said shaft, the said liquid forcing means being provided with passages affording and controlling liquid inlet to and outlet from the said liquid chambers, the effective cross-sectional areas of the passages for one of said chambers being unequal to the effective cross-sectional areas of the passages for the other chamber when the piston means is in normal position, and the said passages adapting the said forcing means in the operation of the device to resist the relative rotation of the shaft in one direction by a force substantially greater at approximately the end of such rotation than at any other point thereof and to resist the relative rotation of the shaft in the other direction by a force which, when the shaft reaches normal position, has become appreciable and greater than the force resisting the opposite rotation of the shaft in the same position thereof though markedly less than the maximum force resisting the rotation in the said opposite direction.

11. In a shock absorber for vehicles, the combination of a casing forming a substantially liquid-tight chamber; a body of liquid in said chamber; a shaft extending from the outside to the inside of said casing through the wall thereof and rotatable in relation thereto; and double acting liquid forcing means in said casing comprising two liquid chambers and piston means movable therein and operatively connected to the said shaft, said liquid forcing means being provided with means affording and controlling liquid inlet to and outlet from the said chambers and adapting the said forcing means to resist the relative rotation of the said shaft in one direction by a force which is relatively small during movement from one extreme to the intermediate normal position of said shaft and which increases to a maximum at a predeterminable relative rate as the rotation proceeds from said normal position towards the opposite extreme, and to resist the relative rotation of the said shaft in the opposite direction by a force which from the last named extreme to the intermediate normal position of the shaft is at all times less than the said maximum and at or near the intermediate normal position of the shaft is greater than the force at the intermediate normal position resisting the movement in the first named direction.

12. In a shock absorber for vehicles, the combination of double acting liquid forcing means comprising two liquid chambers and piston means movable therein; and liquid in said liquid chambers; the said liquid forcing means being provided with means affording and controlling liquid inlet to and outlet from the said chambers and adapting the liquid forcing means to resist movement of the piston means in the chambers in one direction by a force which is relatively small during movement from one extreme to the intermediate normal position of the piston means and which increases to a maximum at a predetermined relative rate as the movement of the piston means proceeds from said normal position towards the opposite extreme, and to resist movement of the piston means in the reverse direction by a force which from the last named extreme to the intermediate normal position of the piston means is at all times less than the said maximum and at or near the intermediate normal position of the piston means is greater than the force at the intermediate normal position resisting the movement in the first named direction.

13. In a spring suspension for vehicles, the combination with the axle and the spring suspended frame of the vehicle of a shock absorber comprising a casing; a shaft extending from the outside to the inside of said casing through the wall thereof and rotatable in relation thereto; double acting liquid forcing means comprising two liquid chambers and piston means movable therein and operatively connected to the said shaft; operative connections between the casing and the vehicle frame; a crank arm fixed to the said shaft; and operative connections between the crank arm and the axle; the said liquid forcing means being provided with passages affording and controlling liquid inlet to and outlet from the said liquid chambers and adapting the said forcing means to resist the relative rotation of the said shaft in one direction in relation to the casing by a force substantially greater at approximately the end of such rotation than at any other point thereof and to resist the relative rotation of the shaft in the other direction by a force which, before the shaft reaches normal position, has become appreciable though markedly less than the maximum force resisting rotation in the first direction, and the operative connections between the piston means and the axle being adapted to transmit force from the axle to the piston means with a substantially lower mechanical advantage when the shaft is at the end of its rotation in the first mentioned direction than when it is in its intermediate normal position.

In testimony whereof I hereunto affix my signature.

GORDON R. PENNINGTON.